(12) United States Patent
Strubel et al.

(10) Patent No.: US 11,306,933 B2
(45) Date of Patent: Apr. 19, 2022

(54) METHOD AND DEVICE FOR INTERNET-BASED OPTIMIZATION OF PARAMETERS OF HEATING CONTROL

(71) Applicant: Viessmann Werke GmbH & Co. KG, Allendorf (DE)

(72) Inventors: Jan Strubel, Darmstadt (DE); Christian Arnold, Neuhof-Rommerz (DE)

(73) Assignee: Viessmann Werke GmbH & Co. KG, Allendorf (DE)

( * ) Notice: Subject to any disclaimer, the term of this patent is extended or adjusted under 35 U.S.C. 154(b) by 260 days.

(21) Appl. No.: 16/496,108

(22) PCT Filed: Feb. 5, 2018

(86) PCT No.: PCT/EP2018/052796
§ 371 (c)(1),
(2) Date: Sep. 20, 2019

(87) PCT Pub. No.: WO2018/171969
PCT Pub. Date: Sep. 27, 2018

(65) Prior Publication Data
US 2020/0096215 A1    Mar. 26, 2020

(30) Foreign Application Priority Data
Mar. 24, 2017  (DE) .................. 10 2017 205 033.0

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/62* (2018.01); *G05B 15/02* (2013.01);
(Continued)

(58) Field of Classification Search
CPC ........ F24F 11/30; F24F 11/62; F24F 2120/00; F24F 2120/10; G05B 15/02
(Continued)

(56) References Cited

U.S. PATENT DOCUMENTS

| | | |
|---|---|---|
| 2013/0238144 A1 | 9/2013 | Shahapurkar et al. |
| 2014/0284391 A1 | 9/2014 | Schmidlin et al. |

(Continued)

FOREIGN PATENT DOCUMENTS

| | | |
|---|---|---|
| CH | 705804 A1 | 5/2013 |
| DE | 69918379 T2 | 7/2005 |

(Continued)

OTHER PUBLICATIONS

English translation of Examination Report dated Nov. 29, 2021 for corresponding German App. Ser. No. 10 2017 205 033.0.

*Primary Examiner* — Md Azad
(74) *Attorney, Agent, or Firm* — Henricks Slavin LLP

(57) ABSTRACT

The present invention relates to a method for determining a set of optimized control parameters ($\Theta_k$) of a closed-loop controller (3) or an open-loop controller for an HVACR (heating, ventilation, air conditioning and refrigeration) system (2). In a first method step, an outside temperature ($T_A$), an actual room temperature ($T_R$) of a room (9), a supply temperature ($T_{VL}$), a predefined target room temperature ($T_{R,W}$), and a predefined target supply temperature ($T_{VL,W}$) are detected. From the detected measured values ($T_A$, $T_R$, $T_{R,W}$, $T_{VL}$, $T_{VL,W}$) and a time ($t_k$) of detection data packet ($D_k$) is generated, which is transmitted via an internet connection to a server (8) where the data packet ($D_k$) is stored in a storage medium (6, 7) connected to the server (8). In the next method step, a set of optimized control parameters ($\Theta_k$) is calculated on the basis of the measured values ($T_A$, $T_R$, $T_{R,W}$, $T_{VL}$, $T_{VL,W}$) of the transmitted and stored data packet ($D_k$) and on the basis of measured values ($T_A$, $T_R$, (Continued)

$T_{R,W}$, $T_{VL}$, $T_{VL,W}$) of a plurality of further data packets ($D_{0...k}$) generated at an earlier time ($t_{...k}$) of a specified period ($\Delta t$) and/or at least one of a plurality of previously determined sets of optimized control parameters ($\Theta_{k-1}$) by executing a calculation algorithm on the server (8). In the following method step, the calculated set of optimized control parameters ($\Theta_k$) is stored in the storage medium (6, 7) connected to the server (8) and is transmitted via the internet connection to the closed-loop controller (3) or the open-loop controller of the HVACR system (2) or to a user (B) of the HVACR system (2).

8 Claims, 5 Drawing Sheets

(51) Int. Cl.
  *G05B 15/02* (2006.01)
  *F24F 120/00* (2018.01)
  *F24F 110/10* (2018.01)
(52) U.S. Cl.
  CPC ....... *F24F 2110/10* (2018.01); *F24F 2120/00* (2018.01); *G05B 2219/23298* (2013.01); *G05B 2219/2642* (2013.01)

(58) Field of Classification Search
  USPC .......................................................... 700/276
  See application file for complete search history.

(56) References Cited

U.S. PATENT DOCUMENTS

| | | |
|---|---|---|
| 2015/0032267 A1 | 1/2015 | Lindelof et al. |
| 2015/0276253 A1* | 10/2015 | Montalvo ............... H04L 12/12 700/276 |
| 2016/0047568 A1 | 2/2016 | Chan et al. |
| 2016/0246269 A1 | 8/2016 | Ahmed et al. |
| 2016/0283844 A1 | 9/2016 | Jones et al. |
| 2016/0313019 A1* | 10/2016 | Mengle ................. G06F 3/0482 |
| 2016/0313751 A1 | 10/2016 | Risbeck et al. |
| 2016/0377309 A1* | 12/2016 | Abiprojo ................ G06Q 10/06 700/276 |
| 2017/0159982 A1* | 6/2017 | West ....................... F25B 49/00 |
| 2020/0280607 A1* | 9/2020 | Binder .................... H04L 67/12 |

FOREIGN PATENT DOCUMENTS

| | | |
|---|---|---|
| DE | 102012215368 A1 | 3/2014 |
| WO | WO 2013/104948 A1 | 7/2013 |

* cited by examiner

METHOD AND DEVICE FOR INTERNET-BASED OPTIMIZATION OF PARAMETERS OF HEATING CONTROL

The present invention relates to a method for internet-based optimization of control parameters of a closed-loop controller or an open-loop controller for a heating, ventilation, air conditioning and refrigeration (HVACR) system, in particular a central heating system for a building. The invention also relates to a system for carrying out the method according to the invention.

Typically, closed-loop controllers or open-loop controllers of HVACR systems are operated with open-loop and/or closed-loop control algorithms which are parameterized by a user, e.g. the heating contractor or the end customer, during commissioning. A non-optimum parameterization, i.e. the use of non-optimum control parameters of the open-loop and/or closed-loop control algorithms, can result in too much energy being consumed. On the other hand, at low outside temperatures, for example, too little thermal power might be provided to heat a building. Accordingly, it is conceivable that too little thermal power might be provided to cool a building at high outside temperatures. In such cases, the user of the HVACR system can further adjust (iteratively if necessary) the control parameters to the respective case of application, for example depending on the building dynamics, in order to increase the control quality, reduce operating costs or increase the efficiency of the system. However, in order to optimize the control parameters, the user must have expert knowledge of the process to be controlled and of the influence of the parameters of the algorithms on the operation of the system. As an alternative to manually adjusting the control parameters of open-loop and/or closed-loop control algorithms, an automatic adjustment can be carried out using a superimposed identification and adaptation method. Heating contractors and end customers are then completely freed from the task of optimizing the parameterization. In this way it is possible to realize e.g. adaptive heating characteristics of heating circuits.

According to the prior art, a weather-guided control of a heating system, i.e. one that is operated depending on the weather or the season, can ensure that the supply temperature of the heating circuit is adapted to the heat requirement in the building depending on the outside temperature. If the heating system is set in an optimum way, only as much heat is generated as is currently required. For this purpose, for example, the outside temperature is measured and, depending on a desired room temperature (target room temperature) and boundary conditions of the building, the supply temperature required to reach the target room temperature is determined. The relationship between outside and supply temperature is described by a heating characteristic (also known as heating curve), for example. The heating characteristic causes a higher supply temperature to be set when the outside temperature is lower.

Examples of a heating characteristic are shown in FIG. 3. A heating characteristic therefore provides a specific target supply temperature for a specific combination of outside temperature and predefined target room temperature. The heating characteristic is substantially characterized by two parameters: slope and level. The slope of the heating characteristic indicates how strongly the supply temperature changes on the basis of the outside temperature. In an old house with poor thermal insulation, heat losses increase sharply when it gets colder outside. The heating characteristic must then be so steep that the heating provides sufficient thermal power at low outside temperatures to ensure the comfort of the user. In modern and well insulated houses, the change in the outside temperature has less of an effect on the heat losses. Therefore, the heating characteristic can be chosen flatter here. A slight increase in the supply temperature is therefore sufficient even in very cold weather. The level of the heating characteristic defines the base point, i.e. the intersection of the heating characteristic with the vertical axis in FIG. 3. By moving the heating characteristic upwards or downwards (cf. heating characteristic c and d), the heat output of the heating system can be increased or reduced evenly. For example, if it is always a little too warm in a building, the heating characteristic can be lowered by lowering the level. This reduces the target supply temperature over the entire range of the heating characteristic. This can reduce the energy consumption of a heating system.

The heating characteristic is usually seldom set, as a rule when a heating system is installed and if the room temperature is repeatedly too low. This means that a heating system can be operated with a higher than necessary energy consumption. The present invention provides a method and a corresponding system for optimizing the control parameters of a closed-loop controller or an open-loop controller of an HVACR system, i.e. in particular a heating system, via the internet. The method or system according to the invention allows an HVACR system to be adapted to changing boundary conditions caused or influenced e.g. by fluctuations in the outside temperature, solar radiation or by changes to or in the building itself. This means that an HVACR system can be operated in a particularly efficient and energy-saving manner. In addition, undersupply can be avoided.

A method for the internet-based adaptation of a heating system is disclosed in U.S. patent application no. U.S. 2015/0032267 A1, for example. Sensors connected to a heating control unit measure the inside and outside temperature. The control unit uses a neural network to determine a prediction of the required heating energy by means of which a modified outside temperature is calculated to control the heating control accordingly. Here, the control parameters are not optimized but the output signal of the controller is changed in a certain way by modifying an input signal of the controller.

Another control system for the heating of a building is known from the German translation DE 699 18 379 T2 of a European patent specification. A plurality of sensing elements measures the outside temperature as well as the supply temperature and room temperature. The system includes a unit for calculating an optimum heat output with a neural network. The optimum heat output is calculated by predicting the outside conditions and forecasting the inside temperature of the building.

The below described method according to the invention shall optimize the control parameters required for the closed-loop or open-loop controlling of a heating, ventilation, air conditioning and refrigeration (HVACR) system installed in a building with internet support. The optimized parameters can then be set either automatically or by a user on the closed-loop or open-loop controller. For this purpose, a recommendation for action can be sent to the user of the closed-loop or open-loop controller, such as a heating contractor or an end customer of the heating system. The optimized control parameters can be displayed via a device that communicates via the internet, for example via an app on a mobile terminal device.

In order to determine and optimize the control parameters, a device (e.g. an embedded system) records relevant system states of the HVACR system over a certain period of time with suitable sensors and sends them via an internet connection to a central server for further processing. The relevant system states include, for example, an outside temperature of the building, a room temperature of a reference room, a supply temperature, a return temperature, a predefined target room temperature, a specified target supply temperature, a degree of solar radiation on the building and an external heat source input into the reference room. These system states or system variables are partly detected as measured values by corresponding sensors and transmitted to the server as data packets.

The server processes and analyzes the detected system variables to calculate the optimized control parameters. In addition, the server transfers the control parameters optimized by a calculation algorithm to the user. The transfer of the parameters to the user can be carried out as a recommended action for adjusting the optimized control parameters in the controller of the HVACR system. Alternatively, the calculated optimized control parameters can also be directly received and accepted by the closed-loop or open-loop controller of the HVACR system, so that the control of the HVACR system can be optimized automatically. The control parameters can be optimized at regular intervals so that the HVACR system can be continuously adapted to changing boundary conditions.

The object of the invention is to provide a method for optimizing control parameters of a closed-loop or open-loop controller of an HVACR system that has been improved compared to the prior art. In addition, an improved system for optimizing control parameters of a closed-loop or open-loop controller of an HVACR system shall be provided.

According to the invention, this object is achieved by a method for determining a set of optimized control parameters of a closed-loop or open-loop controller for a HVACR (heating, ventilation, air conditioning and refrigeration) system according to claim 1. This object is also achieved by a system for determining a set of optimized control parameters of a closed-loop or open-loop controller for an HVACR system according to claim 6. The system according to the invention is configured in particular to carry out the method according to the invention for determining a set of optimized control parameters. The HVACR system is installed in a building and configured to control the temperature of at least one room, preferably all rooms in the building.

In a first step of the method, at least one outside temperature, i.e. the temperature outside the building, is detected. In order to detect the outside temperature, the system includes at least one outside temperature sensor. This sensor is located at a point useful for this purpose outside the building, e.g. at a wind-protected location at the roof of the building.

In a further step, at least one room temperature of at least one reference room, i.e. the current air temperature of the at least one room, is detected, wherein the temperature of this room shall be used for controlling the HVACR system. In order to detect the actual room temperature, the system includes at least one room temperature sensor arranged in the reference room. Instead of measuring the actual room temperature in just one reference room, the method or system can also be extended in such a way that at least one actual room temperature is measured in several or even all rooms of the building. In this case, the system comprises a large number of room temperature sensors.

Furthermore, a supply temperature is detected in one method step. The supply temperature is the temperature of a heat- or cold-transmitting carrier medium of a heating or cooling circuit of the HVACR system. The system comprises at least one supply temperature sensor for detecting the supply temperature.

In a further method step, a predefined target room temperature is detected. In order to predefine the target room temperature, the system comprises an apparatus for predefining a target room temperature. The target room temperature can, for example, be predefined by a user via a thermostat arranged in the room or a target room temperature can be received via a corresponding interface from a higher-level electronic apparatus, such as a building control system.

In addition, a predefined target supply temperature is detected. For this purpose, the system includes an apparatus for predefining a target supply temperature. This device can, for example, be part of the closed-loop or open-loop controller of the HVACR system. The predefined target supply temperature can, for example, be determined on the basis of the measured outside temperature and the predefined target room temperature via a heating characteristic (see FIG. 3).

In a further method step, a data packet is generated from the detected measured values and a point in time of detection. For this purpose, the system comprises an apparatus for generating a data packet. The data packet can contain a plurality of measured values that are useful for calculating optimized control parameters. In addition, the data packets can also be used to monitor the current state or a historical state of the HVACR system.

The steps of detecting the outside temperature, actual room temperature, supply temperature, target room temperature and target supply temperature can substantially be carried out simultaneously or in short succession. Preferably, the measured values are detected cyclically at predefined points in time. In order to generate the data packet, the measured values only need to be assigned a specific point in time. This assigned point in time can also be the point in time when the data packet was created. However, since temperature changes are relatively slow compared to the processes of detecting and processing the measured values, small time differences do not have a major impact.

The generated data packet is transferred to a server via an internet connection and stored in a storage medium connected to the server. For example, the storage medium can include a buffer storage for the temporary intermediate storage of the received data packets and a permanent memory for the long-term storage of the data packets with a database. In order to transmit the data packet, the system includes a transmission device connected to the closed-loop or open-loop controller of the HVACR system. The transmission device includes a suitable interface for transmitting data packets to the server over the internet. Accordingly, the server includes a suitable interface for receiving the data packets. Conversely, the interface of the server can also send data, in particular the set of optimized control parameters, to the controller or to a user. Accordingly, the interface of the controller is configured to receive data.

A set of optimized control parameters is calculated from the measured values of the transmitted and stored data packet. The control parameters are also calculated on the basis of measured values from a plurality of other data packets generated at earlier points in time of a specified period and/or at least one of a plurality of previously determined sets of optimized control parameters.

The use of further measured values or further data packets of a plurality of earlier points in time or at least one previously determined set of optimized control parameters for calculating the new set of optimized control parameters allows an iterative calculation of the control parameters. In other words, the algorithm for calculating the control parameter can be configured so that additional data packets are used each time a new execution is performed. This means that the optimum control parameters are approached step by step when the calculation process is repeated. The meaning of the terms "optimized control parameters" and "optimum control parameters" is described in more detail below.

The calculation of the set of optimized control parameters is performed by executing a calculation algorithm on the server. For this purpose, the server includes at least one processor that is configured to execute the algorithm.

The calculated set of optimized control parameters is stored in the storage medium connected to the server and transferred via the internet connection from the server to the closed-loop or open-loop controller of the HVACR system. Alternatively or additionally, a notification can be sent to a user of the HVACR system with the calculated set of optimized control parameters. The interfaces of the server and the closed-loop or open-loop controller of the HVACR system are thus each designed for sending and receiving data packets or control parameters.

In order to improve the result of the calculation of optimized control parameters, further measured values can be detected which are taken into account when calculating the control parameters. For this purpose, at least one return temperature, a mass flow of the carrier medium through the supply, solar radiation incident on the building and/or an external heat source input are detected. The data packet is then generated accordingly with the further measured value(s). When calculating the set of optimized control parameters, the calculation algorithm uses at least one of the other additional measured values.

The system can have at least one return temperature sensor for detecting the return temperature. In order to detect the mass flow of the carrier medium through the supply or return, the system can have at least one mass flow sensor, which can be arranged accordingly in the supply or return. In order to detect the solar radiation, the system can have a sensor to measure total thermal radiation, such as a global radiation sensor to measure the solar radiation. The system can have an apparatus for detecting an external heat source input in order to detect the external heat source input. The apparatus for generating a data packet can be configured accordingly to generate the data packet including the other measured value(s).

Solar radiation can strongly influence the temperature in a building, for example a room. Since solar radiation is subject to weather and seasonal fluctuations, it can be advantageous if the solar radiation is measured and taken into account when calculating the control parameters.

An external heat source input can come from one or more devices located in the room. In particular electrical devices can emit heat. For example, a refrigerator or stove can generate a significant amount of heat in the room.

The period of time used for calculating the set of optimized control parameters is preferably predefined on the basis of the number of data packets stored in the storage medium. The more data packets are stored in the storage medium of the server, the longer the specified period of time can be predefined. The longer the period used, the more precisely e.g. a mathematical model of the building to be controlled can be calculated. A long time series of stored data packets makes it possible to model the controlled system more precisely. Thus, the calculation of the optimized control parameters can be improved.

In the case of a preferred embodiment of the method according to the invention or the system according to the invention, the calculation of the set of optimized control parameters also includes a step of determining a first deviation between the actual room temperature and the target room temperature for each data packet of a predefined period of time. A small deviation means that the control of the HVACR system is already working well, i.e. the associated control parameters were close to the optimum setting. The smaller the deviation, the closer the determined control parameters are to the optimum setting. Accordingly, a second deviation between the supply temperature and the predefined supply temperature can be determined in a further step for each data packet of the predefined period of time.

Depending on the first and/or second deviation determined, a weighting factor between 0 and 1 can be determined. The purpose of the weighting factor when calculating the set of optimized control parameters is to give greater consideration to data packets with a low first and/or second deviation and to give less consideration to data packets with a high first and/or second deviation. In other words, the algorithm looks for data sets where input variables, such as a supply temperature, have been generated that have resulted in a near-optimum output curve, such as a low deviation between room temperature and target room temperature.

Alternatively, the set of optimized control parameters can only be calculated from those stored data packets for which the determined first deviation and/or the determined second deviation is/are less than or equal to a predefined threshold value. This corresponds to using a weighting function that assumes either zero or one.

It is preferable for the respective sensors to detect the measured values regularly after a predefined time interval has elapsed. The time interval can be a few minutes or hours, for example. Thus, every ten or fifteen minutes a set of measured values can be detected and a corresponding data packet can be generated. Furthermore, the processor can recurrently calculate the set of optimized control parameters when a predetermined plurality of predefined time intervals have expired, so that a corresponding plurality of generated data packets for calculating the set of optimized control parameters are stored in the storage medium of the server. This can be done once, twice or several times a day, every two days, once a week or only a few times a month. The time intervals for recording the measured values or calculating the optimized control parameters can be set in the controller or server depending on the available memory space. The time intervals can also be adapted to the complexity of the HVACR system, the number of measured values, the speed of the internet connection or similar boundary conditions.

BRIEF DESCRIPTION OF THE DRAWINGS

Further advantageous embodiments are described in more detail below on the basis of an exemplary embodiment which is shown in the drawings but to which the invention is not, however, limited.

The drawings show schematically.

DETAILED DESCRIPTION OF THE INVENTION ON THE BASIS OF EXEMPLARY EMBODIMENTS

In the following description of a preferred embodiment of the present invention, equal reference signs designate equal or similar components.

First Exemplary Embodiment

Figure 1:
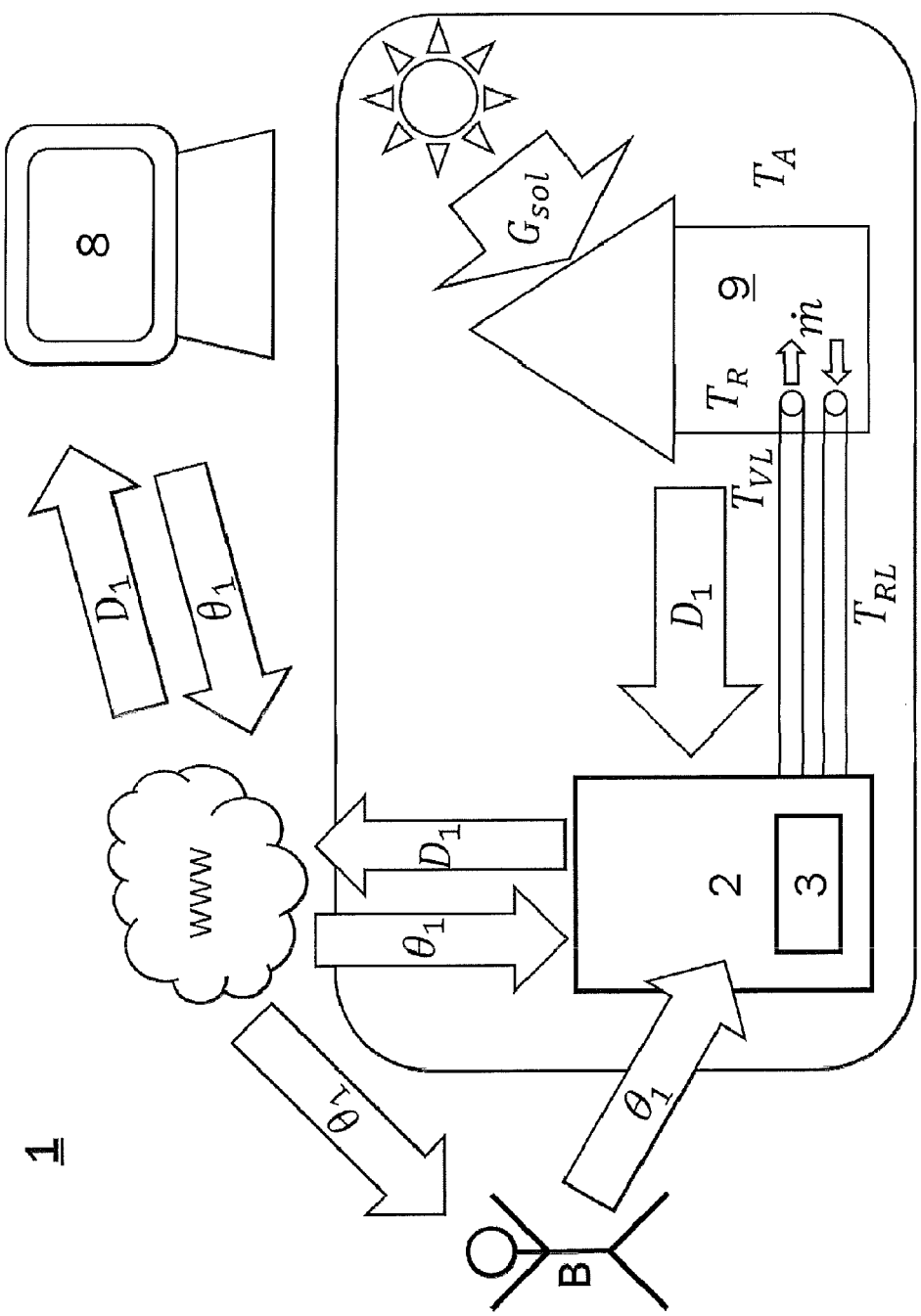
FIG. 1 shows a structural design of a system or a method for the internet-based optimization of control parameters of a heating system according to a first exemplary embodiment of the invention.

FIG. 1 shows a first exemplary embodiment of a system 1 for calculating a set of optimized control parameters $\Theta$ or $\Theta_k$ of a closed-loop controller 3 or an open-loop controller 3 for an HVACR (heating, ventilation, air conditioning and refrigeration) system 2 with the characteristic signal flow according to the method of the invention. The vectors $\Theta = \{\vartheta_1 \ldots \vartheta_q\}$ or $\Theta_k = \{\vartheta_1 \ldots \vartheta_q\}_k$ represent a set of a total of q control parameters. The index k refers to the current point in time and indicates that this is an iteratively optimized set of control parameters. The set of control parameters $\Theta$ without the running index k, for example, is used in the conventional least squares method without an iterative calculation method.

As an example of an HVACR system 2, a heating system 2 is considered in the following. The heating system 2 is installed in a building. The following is an example of a single room 9, the temperature $T_R$ of which is controlled by the heating system 2. This room 9 can also be used as a reference room for the temperature control of the entire building. Alternatively, several reference rooms can be used, or a temperature control can be conducted for each room in the building.

The heating system 2 continuously detects relevant system states, such as the outside temperature $T_A$, the room temperature $T_R$, the supply temperature $T_{VL}$, the return temperature $T_{RL}$ and the mass flow $\dot{m}$ of a carrier medium through a supply pipe or through a return pipe of the heating system 2 and transmits these measured values summarized as data packet $D_k$ of the measurement time $t_k$ via the internet to a server 8. In addition, the solar radiation $G_{sol}$, which contributes to the heating of the building or the room, can be detected via a suitable sensor.

The server 8 is designed to store and evaluate the received data packets $D_k$ and thus to determine a set of optimized control parameters $\Theta_k$ for a heating controller 3 of the heating system 2. The set of optimized control parameters $\Theta_k$ can then be transmitted to a user B, for example the heating contractor or the end customer, who then has the possibility to decide whether to accept the control parameters $\Theta_k$. In this case, the user B sets the control parameters $\Theta_k$ on the controller 3. Alternatively, the optimized control parameters $\Theta_k$ can also be transmitted directly via the internet to the heating controller 3 and adopted by it.

The method according to the invention can therefore also be used for heating controllers of older heating systems, the control parameters of which cannot be adjusted via the internet. The central server 8 can also simultaneously determine optimized control parameters for several different remote HVACR systems. For this purpose, the server receives 8 data packets of several HVACR systems, evaluates them and transmits the calculated optimized control parameters to the respective user or controller.

Figure 2A:
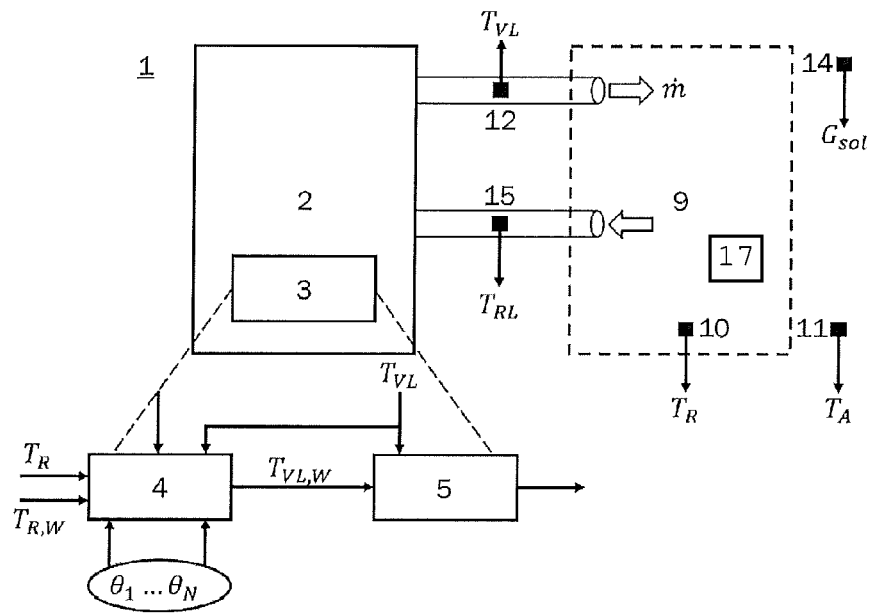
FIG. 2a and FIG. 2b show further details of the first exemplary embodiment of the invention.
Figure 2B:
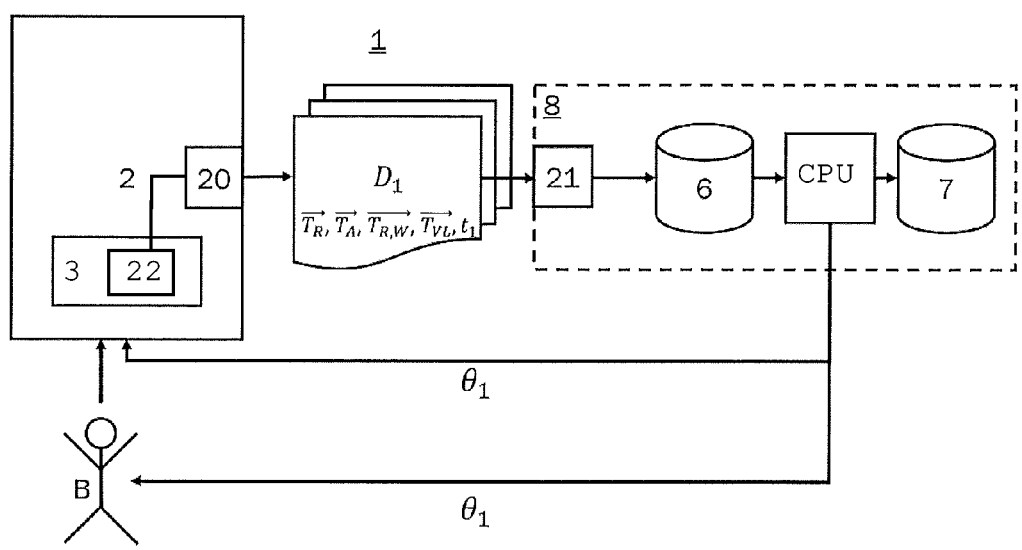

FIG. 2a and FIG. 2b show further details of the first exemplary embodiment of the invention. FIG. 2a shows part of system 1 for determining a set of optimized control parameters $\Theta_k$. The system comprises several sensors for recording relevant system states. A supply temperature sensor 12 for detecting the supply temperature $T_{VL}$ is arranged in the supply of the heating system 2. In the return of the heating system 2 there is a return flow temperature sensor 15 for detecting the return temperature $T_{RL}$. A mass flow sensor can also be arranged in the supply pipe and/or in the return pipe to detect the mass flow $\dot{m}$. A room temperature sensor 10 arranged in the room 9 detects the room temperature $T_R$. The heating system 2 supplies the supply flow with a carrier medium that transports heat to a radiator 16 arranged in the room 9. A thermostat 17 in room 9 can be used to predefine a target room temperature $T_{R,W}$.

Outside the building there is an outside temperature sensor 11 for detecting the outside temperature $T_A$ and a solar radiation sensor 14 for detecting solar radiation $G_{sol}$. In addition, at least one further sensor (not shown) for detecting an external heat source input $P_{FW}$ can be arranged in the room. A source for an external heat source input $P_{FW}$ can be e.g. an electrical appliance that emits heat, such as a refrigerator or an electric stove.

The controller 3 of heating system 2 has a heating circuit controller 4 and a boiler controller 5. The heating circuit controller 4 is supplied with at least the measured variables, room temperature $T_R$, outside temperature $T_A$, target room temperature $T_{R,W}$ and supply temperature $T_{VL}$. Optionally, at least one of the measured variables, i.e. solar radiation $G_{sol}$, mass flow $\dot{m}$ and/or external heat source input $P_{FW}$, can be supplied to the heating circuit controller. The heating controller 4 determines a target supply temperature $T_{VL,W}$, which is output to a boiler controller 5, using a control method predefined for the heating controller 4. The control method used by heating controller 4 can, for example, be based on a heating characteristic, as described in more detail below. In general, the heating controller 4 uses a set of control parameters $\Theta = \{\vartheta_1 \ldots \vartheta_N\}$. For a heating characteristic, for example, the set of control parameters includes the two parameters slope $\vartheta_1 = \theta_S$ and level $\vartheta_2 = \theta_L$, for example.

FIG. 2b illustrates the transmission of the measured values in the form of data packets $D_k$ to a server 8 for calculating optimized control parameters $\Theta_k$. The heating controller 3 comprises a device 22 for generating the data packet $D_k$ with the measured values and a point in time $t_k$ for detecting the measured values. Via an interface 20 to the internet, the data packet $D_k$ is transmitted to a server 8, which is also connected to the internet via an interface 21.

The server 8 comprises a buffer 6, in which the received data packet $D_k$ is first intermediately stored, and a permanent memory 7 with a database in which received data packets and calculated control parameters are stored. The server 8 also has a CPU processor that is configured to calculate a set of optimized control parameters $\Theta_k$ from the data packets. The set of optimized control parameters $\Theta_k$ can then be retransmitted to the controller 4 or to a user of the heating system 2 via the interface 21.

The heating controller 4 of the heating system 2 of the first exemplary embodiment can be controlled, for example, by means of a heating characteristic curve. The heating characteristic describes a relationship between the outside temperature $T_A$ and the target value of the supply temperature $T_{VL,W}$ of heating system 2. A heating characteristic is characterized by the two parameters level $\theta_N$ and slope $\theta_S$. The set of heating characteristic parameters $\Theta_k$ to be optimized is therefore $\Theta_k=\{\theta_N, \theta_S\}_k$.

With a heating characteristic curve, a weather-guided operation of the heating system 2 can be achieved. In the optimization method according to the invention, the system states, i.e. supply temperature $T_{VL}$, outside temperature $T_A$ and temperature in the reference room $T_R$, are detected using the corresponding temperature sensors 10, 11 and 12 shown in FIG. 2a. The target room temperature $T_{R,W}$, for example, can be predefined by a user via the thermostat 17.

Figure 3:
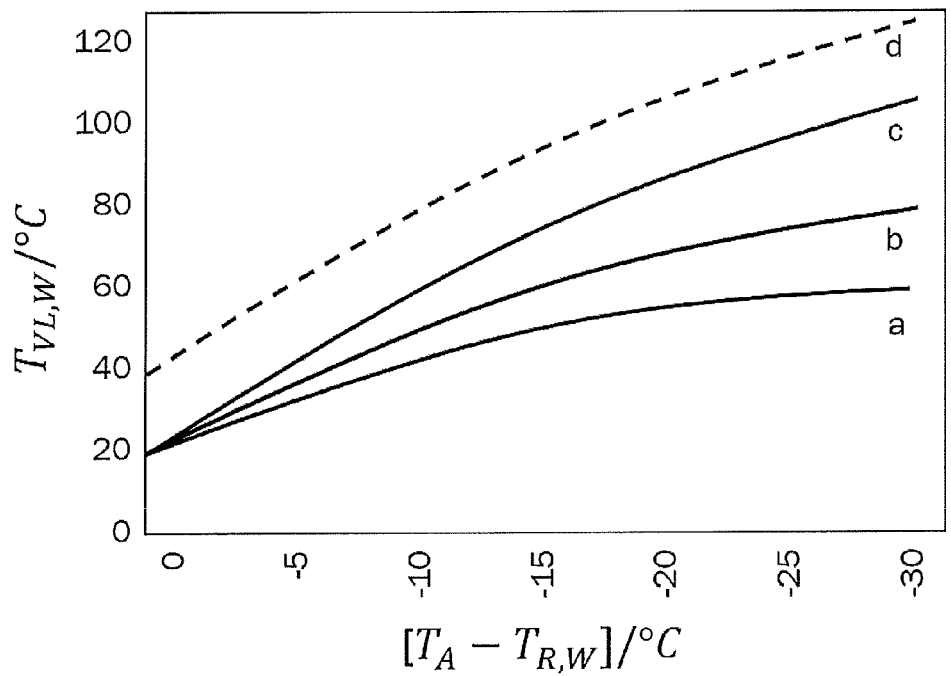
FIG. 3 shows four exemplary heating characteristic curves.

FIG. 3 shows four exemplary heating characteristics a to d for different values of the parameters, slope $\theta_S$ and level $\theta_N$, at a target room temperature $T_{R,W}$ of 20° C. The three heating characteristics a to c differ only in the parameter slope $\theta_S$. It can be seen that the heating characteristic is steeper when the slope $\theta_S$ is increased (from a to c). A change in the level $\theta_N$ parameter shifts the characteristic curve in the vertical direction accordingly. This is illustrated using the two heating characteristic curves c and d as examples. Depending on the outside temperature $T_A$ and the adjusted room temperature $T_{R,W}$, the heating controller 4 uses the heating characteristic to calculate the target value of the supply temperature $T_{VL,W}$, which is passed on to the boiler controller 5 as shown in FIG. 2a.

In the case of generic heating controllers of the prior art, the two parameters, slope and level, of the heating characteristic can be adjusted, e.g. via a configuration menu on the heating controller. Often, an installer of a heating system only sets the parameters depending on the building properties when the heating system is commissioned. In some cases, heating controllers are even operated with the parameters set in the as-delivered state. The parameters are usually only adapted during the heating operation if there is a considerable deviation from the expected comfort of the heating system. In order to avoid an undersupply of heat, heating systems are often operated with a higher supply temperature than necessary. This can lead to excessive energy consumption.

The parameters, slope $\theta_S$ and level $\theta_N$, of the heating characteristic can be optimized with the system 1 according to the invention. This means that the heating system 2 can be operated in a particularly efficient way. An excessive energy requirement or an insufficient amount of heat provided is avoided.

As described above, the time-dependent measured values or target values of the relevant status variables are detected at regular intervals and transmitted to the server 8 as data packets. The measured values can here be represented as data vectors which comprise all measured values of a time series. For example, the measured values can be recorded over a period of one day with a resolution $t_S$ of 15 minutes, so that 96 data packets $D_1 \ldots D_{96}$ are generated in 24 hours and transmitted to the server. The data vector $\vec{T}_A$ thus comprises 96 measured values of the outside temperature:

$$\vec{T}_A=[T_A(1) \ldots T_A(96)]$$

Therefore, the server 8 can calculate the optimized control parameters again at regular intervals $t_S$. In particular, the control parameters can be calculated iteratively. This means that either the data packets of past points in time or previously calculated control parameters are used in the calculation of the control parameters.

Figure 5A:
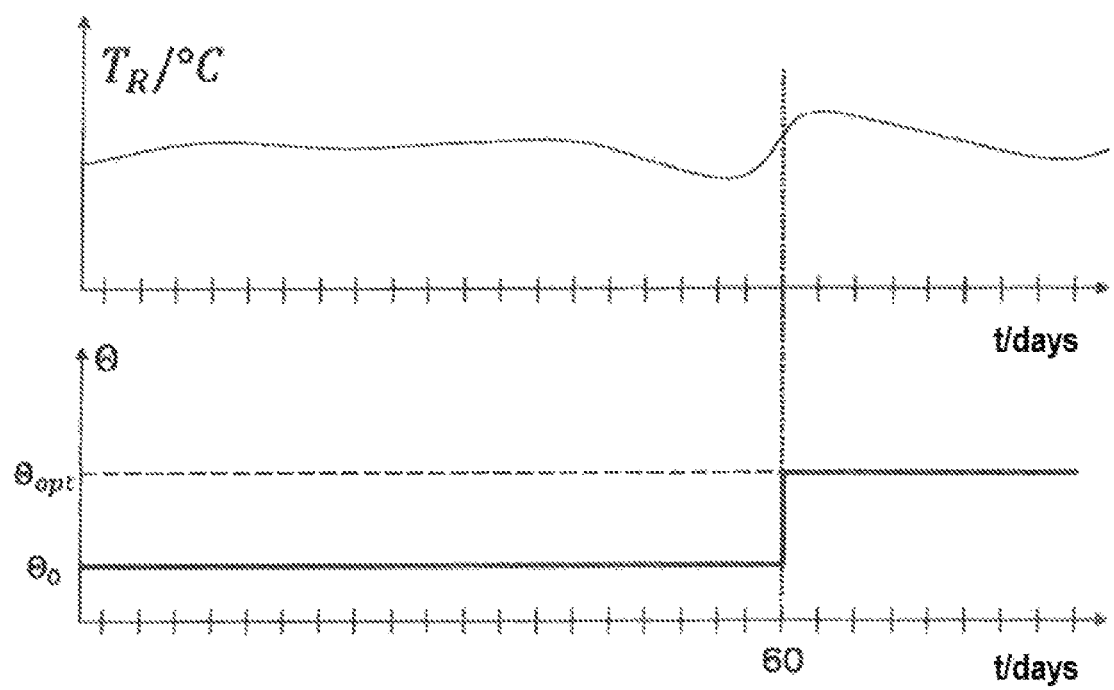
FIG. 5a and FIG. 5b each show a long time series of measured values of a room temperature and a corresponding course of optimized control parameters.

The advantage of the iterative approach is now illustrated by a comparison of a conventional method with the illustrated iterative calculation according to the invention. The calculation of the set of optimized control parameters can, for example, be carried out using known methods. In the following, two exemplary embodiments of the calculation procedure are described. With a conventional least squares method for optimizing control parameters of a heating controller, measured data must first be recorded over a long period of time. The upper diagram in FIG. 5a shows an example of a measured curve of the room temperature $T_R$ over a period of 60 days. This means that when 96 data packets are detected per day, a total of 60·96=5760 data packets are stored and evaluated when the control parameters are calculated. The lower diagram in FIG. 5a shows an initial value $\Theta_0$ of the control parameters as well as the wanted set of optimum control parameters $\Theta_{opt}$. The conventional method requires 60 days to deliver a result here. The large number of data packets can also make the calculation of the control parameters very time-consuming.

Figure 5B:
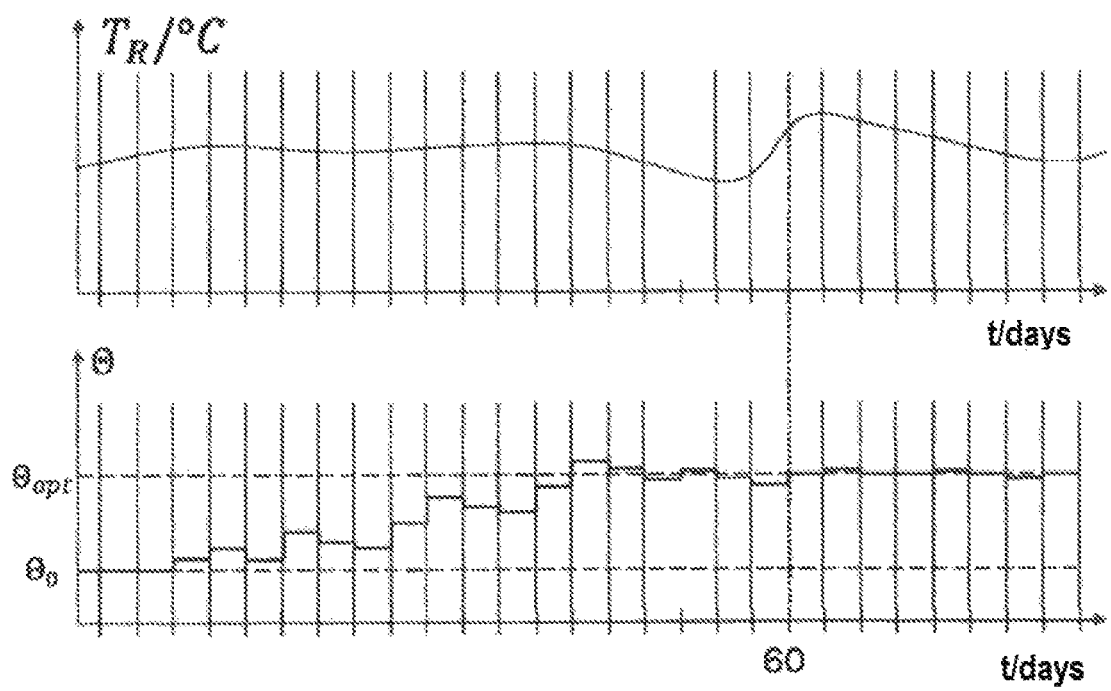

The advantage of the iterative execution of the calculation of optimized control parameters is described on the basis of FIG. 5b. The upper diagram again shows a curve of the room temperature $T_R$ over a period of 60 days. The lower diagram accordingly shows the curve of the control parameters based on the same initial value $\Theta_0$ and the wanted set of optimum control parameters $\Theta_{opt}$. In the illustrated example, a daily calculation of the set of optimized control parameters is carried out, each time with 96 data packets transmitted and stored, as well as starting from the set of control parameters calculated the day before. This means that a much smaller amount of data has to be processed during the calculation. In addition, the data packets can be deleted every day after calculating the optimized control parameters, so that there is a much smaller memory requirement compared to the conventional method. As the progression of the control parameters in the lower diagram in FIG. 5b illustrates, the result iteratively approaches the wanted optimum set of control parameters. This means that the controller can be operated with optimized control parameters much earlier than in the comparison example in FIG. 5a. In addition, the calculation effort is considerably lower.

Standard Least Squares Method

A first exemplary embodiment of a calculation algorithm for calculating a set of optimized control parameters uses a least squares method. A conventional least squares method determines optimized control parameters $\Theta$ by solving the linear equation system:

$$A\Theta=b \qquad (1)$$

in the sense of $$\arg\min_{\Theta}\|A\Theta - b\|$$

Matrices A and b here represent the so-called data matrices of the underlying estimation problem. Typically, more data points and thus lines of the data matrices are available as parameters to be estimated, so that the present linear equation system is overdetermined. Such a conventional least squares method is described e.g. in Stoer/Bulirsch: *Numerische Mathematik* 1, Springer Verlag, Berlin, 2007, page 250 et seq.

Equation (1) initially discloses $$A^TA\Theta=A^Tb.$$

Assuming that the ATA is regular, the parameters to be estimated follow from $$\theta = (A^T A)^{-1} A^T b$$

with $$\theta \in \mathbb{R}^q, A \in \mathbb{R}^{N \times q}, b \in \mathbb{R}^N, N >> q.$$

A heating characteristic is characterized by a set with two parameters, slope $\theta_S$ and level $\theta_N$, as described above. The number of parameters is therefore q=2. The result therefore is:

$$A^T A \in \mathbb{R}^{q \times q}, A^T b \in \mathbb{R}^q$$

With the abbreviations
L:=$A^T A$,
r:=$A^T b$
the solution can also be compactly implemented through $$\theta = (A^T A)^{-1} A^T b = L^{-1} r$$

This representation later forms the starting point for an iterative formulation of the estimation problem.

Weighted Least Squares Method

The standard least squares method can be further generalized by weighting the individual lines of the data matrices and thus the data points. A detailed scientific paper of the methods described in this and the next section is described e.g. in Ljung, L.: System Identification—Theory for the User, Prentice Hall, Upper Saddle River (1999) and R. Isermann and M. Münchhof: Identification of Dynamic Systems, Springer (2010).

The weighted least squares method later forms the theoretical starting point for applying the least squares method to the optimization of the heating characteristic. The weighting matrix can be represented as follows $$W := \begin{bmatrix} w_1 & & \\ & \ddots & \\ & & w_N \end{bmatrix},$$

wherein $w_i > 0$ and $W \in \mathbb{R}^{q \times q}$.

Then, the weighted least squares problem has to be solved:

$$\arg \min_\Theta \| W \cdot A \Theta - W \cdot b \|$$

Assuming that $A^T W A$ is regular, the equation (1) then discloses the solution to $$\theta = (A^T \cdot W \cdot A)^{-1} A^T \cdot W \cdot b \quad (2)$$

or with the abbreviations
L:=$A^T W A$,
r:=$A^T W b$
the compact presentation $$\theta = (A^T W A)^{-1} A^T W b = L^{-1} r.$$

Iterative Least Squares Method

With the two approaches described above, it proves to be disadvantageous that first all data points and thus the data matrices A and b must be determined over the entire period, for example a measurement of the data packets $D_0$ to $D_N$, the data packet $D_N$ determining the end of the measurement period, which can require a great deal of computing effort. For the large amounts of data, a great deal of storage space and great computer power must be provided. In contrast, it is therefore advantageous to determine a set of optimized control parameters already during the measurement, i.e. when a new data packet is available. The memory space required for this purpose and the necessary computing power can be considerably smaller. This is made possible by an iterative formulation of the least squares problem.

For the iterative approach, the matrices are represented as follows:

$$A = \begin{bmatrix} A_{k-1} \\ A_k \end{bmatrix}; b = \begin{bmatrix} b_{k-1} \\ b_k \end{bmatrix}; W = \begin{bmatrix} W_{k-1} & 0 \\ 0 & W_k \end{bmatrix}$$

For example, the division is to be interpreted in such a way that variables with the index k−1 represent results of optimized control parameters from past data packets (data packets up to the time point k−1). The index k thus points to a newly generated data packet $D_k$, which is used to update new control parameters $\Theta_k$.

From equation (2) thus follows:

$$\Theta_k = \left( [A_{k-1}^T A_k^T] \begin{bmatrix} W_{k-1} & \\ & W_k \end{bmatrix} \begin{bmatrix} A_{k-1} \\ A_k \end{bmatrix} \right)^{-1} \left( [A_{k-1}^T A_k^T] \begin{bmatrix} W_{k-1} & \\ & W_k \end{bmatrix} \begin{bmatrix} b_{k-1} \\ b_k \end{bmatrix} \right)$$

$$\Theta_k = (A_{k-1}^T W_{k-1} A_{k-1} + A_k^T W_k A_k)^{-1} (A_{k-1}^T W_{k-1} b_{k-1} + A_k^T W_k b_k)$$

With the abbreviations
$L_k := A_k^T W_k A_k$
$r_k := A_k^T W_k b_k$
equation (1) can thus be compactly represented by $$\Theta_k = (L_{k-1} + L_k)^{-1} (r_{k-1} + r_k).$$

The course of a procedure for calculating $\Theta_k$ can be summarized as follows using the example of data packets $D_0$ to $D_N$.

1. For the data packet $D_0$, in a first step $$L_0 := A_0^T W_0 A_0 \text{ und } r_0 := A_0^T W_0 b_0$$

is calculated. This can be used to determine $$\theta_0 = (L_0)^{-1} (r_0)$$

2. In a second step, the following is calculated for the data packet $D_1$ $$L_1 := A_1^T W_1 A_1 \text{ und } r_1 := A_1^T W_1 b_1.$$

and $$\theta_1 = (L_0 + L_1)_{-1} (r_0 + r_1)$$

is determined therefrom.

3. Accordingly, the following is calculated in a third step for the data packet $D_k$ $$L_k := A_k^T W_k A_k \text{ and } T_k := A_k^T W_k b_k.$$

The following can be calculated therefrom $$\theta_k = (L_{k-1} + L_k)^{-1} (r_{k-1} + r_k)$$

4. Then,
$L_{k-1} \rightarrow L_{k-1} + L_k$ and $r_{k-1} \rightarrow r_{k-1} + r_k$
are set and the run variable k is increased by one.

5. If k=N+1, the procedure is terminated. Otherwise return to step 3.

The following follows for the example the heating characteristic optimization:

$A_k \in \mathbb{R}^{N \times q}$
$L_k \in \mathbb{R}^{q \times q}$
$r_k \in \mathbb{R}^q$
$b_k \in \mathbb{R}^N$
$\theta_k \in \mathbb{R}^q$ For a daily calculation with a time resolution of 15 minutes, the parameters are N=96; q=2. Only the parameters $\theta_k$, $L_{k-1}$, $r_{k-1}$ need to be stored in the storage medium 7 of the server 8, so that there is considerably less memory requirement compared with a conventional method. Basically, all parameter optimization problems of a control, which can be represented by equation (1), can be efficiently managed and calculated on the server 8 using the above described procedure according to the invention.

Adaptation to a Heating Characteristic Curve

It is shown below how the method described above can be used to optimize a heating characteristic. A heating characteristic describes a static relationship between outside temperature $T_A$, target room temperature $T_{R,W}$ and target supply temperature $T_{VL,W}$ and is described by equation (3):

$$T_{VL,W} = T_{R,W} + \theta_L - \theta_S \left( \sum_{\alpha=1}^{3} (T_A - T_{R,W})^\alpha \cdot a_\alpha \right) \quad (3)$$

Here, $a_\alpha$ are known, previously defined parameters of the heating curve.

Equations (1) and (3) lead to the data matrices:

$$b := \overline{T}_{VL,W} - \overline{T}_{R,W}$$

$$A := \left[ \begin{bmatrix} 1 \\ \vdots \\ 1 \end{bmatrix}, -1 \cdot \left( \sum_{\alpha=1}^{3} (\overline{T}_A - \overline{T}_{R,W})^\alpha \cdot a_\alpha \right) \right]$$

with the parameters to be determined $$\Theta := \begin{bmatrix} \theta_L \\ \theta_S \end{bmatrix}$$

Rule Deviations $$e_{VL} := T_{VL,W} - T_{VL}$$

$$e_R := T_{H,W} - T_R$$

Figure 4:
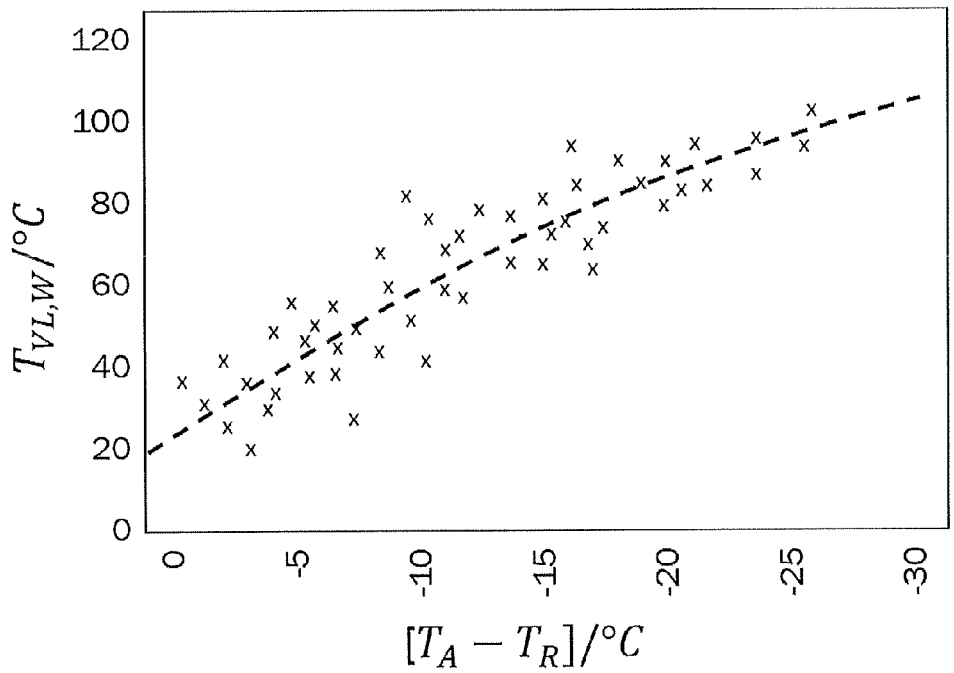
FIG. 4 shows an example of a heating characteristic fitted to a plurality of measured values.

With the temperature sensors shown in FIG. 2a, the measured values $T_{VL}(t)$, $T_A(t)$, $T_R(t)$, $T_{VL,W}(t)$, $T_{R,W}(t)$ are recorded at regular time intervals and transmitted in data packets as time series to the server 8 where they are stored and evaluated. FIG. 4 shows how a heating characteristic can be determined from the measured values. In FIG. 4, the measured values are plotted in a diagram. The plotted data points obtained from the measured values can also be filtered using a weighting function, so that only those data points are used for which the deviations $e_{VL}$ and/or $e_R$ are very small. The heating characteristic curve fitted to the data points then supplies the optimized control parameters $\Theta_k$ which can be transferred to the heating controller 3.

For example, a Gaussian distribution curve can be used as a weighting function:

$$W_{\{VL,R\},i} = \exp\left( -\frac{e_{\{VL,R\},i}^2}{2\sigma_{\{VL,R\}}} \right)$$

The setting parameters $\sigma_{VL}$ and $\sigma_R$ are essentially freely selectable. Depending on the quantity of the data packets available for the evaluation or depending on the scatter of the measured values, the setting parameters can be set larger or smaller in order to determine a set of optimized control parameters $\Theta_k$.

Second Exemplary Embodiment: System Identification

In contrast to the heating characteristic curve of the first exemplary embodiment, the second exemplary embodiment deals with an explicit control of the temperature $T_R$ of a reference room 9 in a building. The second exemplary embodiment describes how a dynamic model M can be determined using the internet and the stored data packets. The model M is a mathematical description of the relationships between the supply temperature $T_{VL}$ and the outside temperature $T_A$ to the room temperature $T_R$. The model is determined on the basis of the measured data.

The data packets are generated and transferred to a server 8 as described above using the first exemplary embodiment. In the following, therefore, only the details of the mathematical method for calculating the optimized control parameters $\Theta_k$ are dealt with.

A mathematical building model allows the control parameters of a controller 3 of an HVACR system 2 to be specifically optimized, for example by means of a P, PI or PID controller, on the basis of the model. The optimization can be carried out e.g. by standard control methods such as root locus curves, frequency line methods, etc. The determination of the parameters of the building model and the calculation of the optimized control parameters $\Theta_k$ are carried out as in the first exemplary embodiment on a server 8 that communicates with the controller via an internet connection. The controller 3 itself works locally, for example in the heat generator of a heating system 2, and is automatically reparameterized at regular intervals (e.g. daily, weekly or monthly).

According to the second exemplary embodiment of the invention, the control parameters are optimized using a model M of the controlled system. For this purpose, a calculation algorithm executed on server 8 determines a mathematical relationship between the input and output data of the control process on the basis of the measurement data obtained, i.e. the data packets $D_k$.

Figure 6:
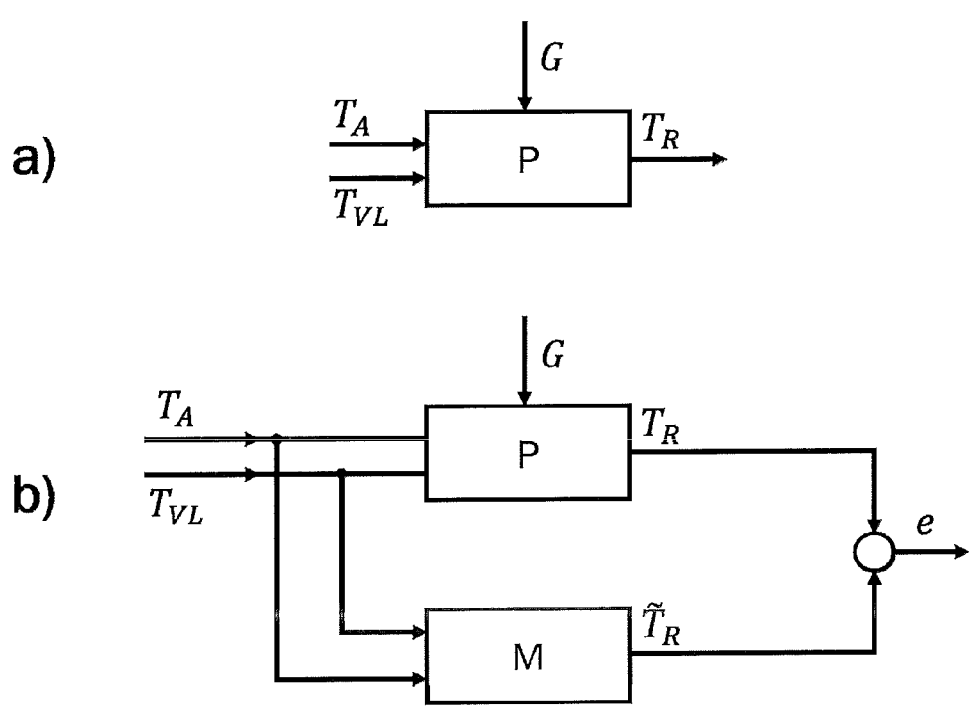
FIG. 6a illustrates a simplified signal flow of the physical process of a heating circuit.
FIG. 6b illustrates the approximation of the process by a mathematical model.

FIG. 6a shows the initial situation for an exemplary process P, here a heating circuit. The outside temperature $T_A$ is a measurable disturbance variable. The supply temperature $T_{VL}$ of the heating circuit is the input variable. The room temperature $T_R$ is the output or controlled variable. Further, non-measurable, disturbance variables are designated by $G = [g_1, \ldots, g_q]$.

The aim of the method is to determine a mathematical model M so that the output variable $T_R$ supplied by model M corresponds as exactly as possible to the measured room temperature $T_R$, as schematically shown in FIG. 6b. The aim is therefore to minimize the deviation e between the output variable $T_R$ and the measured room temperature $T_R$.

As a simple approach for model M, for example, a time-discrete transfer function in the frequency domain for the supply temperature $G_{VL}(Z)$ and a time-discrete transfer function for the outside temperature $G_A(Z)$ can be selected, from which $$T_R(Z) = G_{VL}(Z) \cdot T_{VL}(Z) + G_A(Z) \cdot T_A(Z)$$

follows. The time t is expressed in the following as a multiple of a sampling time $t_S$, so that: $t = k \cdot t_s$. The time-discrete transfer function in the frequency domain is expressed here as a time-discrete transfer function in the image domain of a Z-transformation.

The transfer function in the frequency domain corresponds in the time domain to the difference equation $$T_R(k \cdot t_S) = -\sum_{i=0}^{N_p-1} a_i T_R((k - N_p + i)t_S) + \qquad(4)$$
$$\sum_{i=0}^{N_{Z,VL}} b_{VL,i} T_{VL}((k - N_{Z,VL}^{-1} + i)t_S) + \sum_{i=0}^{N_{Z,A}} b_{A,i} T_A((k - N_{Z,A}^{-1} + i)t_S)$$
$$k \in \{0, 1, \ldots\}; N_{Z,VL} \le N_p; N_{Z,A} \le N_p$$

$N_p$ is here the number of pole positions of the transfer function and $N_{Z,VL}$ or $N_{Z,A}$ is the number of corresponding zero positions. In principle, these are freely selectable, but can usually be determined in advance from physical considerations.

The mathematical model M calculates the model output using historical values of the outside temperature $T_A$ and room temperature $T_R$, which are stored as data packets in the storage medium 7 of server 8. The calculation of the model parameters $a_i$, $b_{VL,i}$, $b_{A,i}$ can again be presented as a least squares problem as in the first exemplary embodiment: $A\Theta = b$. The matrices A and b can be generated from the data packets $D_i$. The model can be extended accordingly if further disturbance variables are known, such as the solar radiation $G_{sol}$ or an external heat source input $P_{FW}$.

In order to calculate the model parameters, the problem is converted into a least squares problem. The data packets $D_1$ to $D_N$ are used for this purpose. With a sampling time $t_s$ of 15 minutes, for example, N=96 is used for one day. Thus:
k=1, . . . , 96
$N_p=2$
$N_{Z,VL}=1$
$N_{Z,A}=1$
It follows from equation (4) that:

$T_R(k) = -a_1 T_R(k-1) - a_0 T_R(k-2) + b_{VL,1} T_{VL}(k-1) + b_{VL,0} T_{VL}(k-2) + b_{A,1} T_A(k-1) + b_{A,0} T_A(k-2)$

From $D_1, \ldots D_N$ thus follows that:

$$\begin{bmatrix} T_R(1) \\ \vdots \\ T_R(n) \end{bmatrix} = \begin{bmatrix} -a_1 T_R(0) - a_0 T_R(-1) + b_{VL,1} T_{VL}(0) + b_{VL,0} T_{VL}(-1) + b_{A,1} T_A(0) + b_{A,0} T_A(-1) \\ \vdots \\ -a_1 T_R(N-1) - a_0 T_R(N-2) + b_{VL,1} T_{VL}(N-1) + b_{VL,0} T_{VL}(N-2) + b_{A,1} T_A(N-1) + b_{A,0} T_A(N-2) \end{bmatrix}$$

$$= \begin{bmatrix} -T_R(0) & -T_R(-1) & T_{VL}(0) & T_{VL}(-1) & T_A(0) & T_A(-1) \\ \vdots & \vdots & \vdots & \vdots & \vdots & \vdots \\ -T_R(N-1) & -T_R(N-2) & T_{VL}(N-1) & T_{VL}(N-2) & T_A(N-1) & T_A(N-2) \end{bmatrix} \cdot \begin{bmatrix} a_1 \\ a_0 \\ b_{VL,1} \\ b_{VL,0} \\ b_{A,1} \\ b_{A,0} \end{bmatrix}$$

$$= A \cdot \Theta$$

The matrices A and b can therefore be generated from the data packets $D_i$ transferred to the server 8. The transfer functions $G_{VL}(Z)$ and $G_A(Z)$ can be calculated from the control parameters $\theta = [a_1, a_0, \ldots, b_{A,0}]$. If the transfer functions $G_{VL}(Z)$ and $G_A(Z)$ are known, a controller 3 (e.g. a P, PI or PID controller) can be designed to control the room temperature $T_R$. This can be done on the basis of the model using standard control techniques, for example a root locus curve, a frequency characteristic curve or the like.

Since the parameters of model M are updated cyclically, e.g. daily, weekly or monthly, the result is an adaptive or optimized control of the heating system 2 adapted to the process (here a heating circuit). The control parameters of the controller 3 are updated cyclically accordingly. This allows continuous, internet-based optimization of the controller 3.

The advantage and innovation of this method is that there is no need to maintain and process the parameters for the purpose of identifying them on the embedded systems of the heat generator since these calculations are carried out on the corresponding capacities of the central platform on the internet.

The features disclosed in the above description, the claims and the drawings can be important both individually and in any combination for the realization of the invention in its various embodiments.

LIST OF REFERENCE SIGNS

1 System for determining optimized control parameters
2 HVACR system
3 closed-loop/open-loop controller
4 heating circuit controller
5 boiler controller
6 buffer (storage medium)
7 database (storage medium)
8 server
9 room
10 room temperature sensor
11 outside temperature sensor
12 supply temperature sensor
13 mass flow sensor
14 solar radiation sensor
15 return temperature sensor
16 radiator
17 thermostat
20 interface of the controller
21 interface of the server
22 apparatus for generating data packets
CPU processor B user

The invention claimed is:

1. A method for determining a set of optimized control parameters ($\Theta_k$) of a closed-loop controller (3) or an open-loop controller for an HVACR (heating, ventilation, air conditioning and refrigeration) system (2) comprising the following steps:
    detecting an outside temperature ($T_A$);
    detecting an actual room temperature ($T_R$) of a room (9);
    detecting a supply temperature ($T_{VL}$);
    detecting a predefined target room temperature ($T_{R,W}$);
    detecting a predefined target supply temperature ($T_{VL,W}$);
    generating a data packet ($D_k$) with the detected measured values ($T_A$, $T_R$, $T_{R,W}$, $T_{VL}$, $T_{VL,W}$) and a time ($t_k$) of detection;
    transmitting the data packet ($D_k$) to a server (8) via an internet connection;
    storing the data packet ($D_k$) in a storage medium (6, 7) connected to the server (8); and
    calculating a set of optimized control parameters ($\Theta_k$) on the basis of the measured values ($T_A$, $T_R$, $T_{R,W}$, $T_{VL}$, $T_{VL,W}$) of the transmitted and stored data packet ($D_k$) and on the basis of:
        measured values ($T_A$, $T_R$, $T_{R,W}$, $T_{VL}$, $T_{VL,W}$) of a plurality of further data packets ($D_{0 \ldots k}$) generated at an earlier time ($t_{\ldots k}$) of a specific period ($\Delta t$), and/or
        at least one of a plurality of previously determined sets of optimized control parameters ($\Theta_{k-1}$);
    wherein the set of optimized control parameters ($\Theta_k$) is calculated by executing a calculation algorithm on the server (8) that
        determines a first deviation ($e_R$) between the actual room temperature ($T_R$) and the target room temperature ($T_{R,W}$) for each data packet ($D_{0 \ldots k}$) of a predefined time period ($\Delta t$),
        determines a second deviation ($e_{VL}$) between the supply temperature ($T_R$) and the predefined supply temperature ($T_{VL,W}$) for each data packet ($D_{0 \ldots k}$) of the predefined time period ($\Delta t$), and
        determines and applies a weighting factor between 0 and 1 on the basis of the determined deviations ($e_R$, $e_{VL}$) so that, when calculating the set of optimized control parameters ($\Theta_k$), low deviation data packets ($D_{0 \ldots k}$) are taken more into account and high deviation data packets ($D_{0 \ldots k}$) are taken less into account;
    storing the calculated set of optimized control parameters ($\Theta_k$) in the storage medium (6, 7) connected to the server (8); and
    transmitting the calculated set of optimized control parameters ($\Theta_k$) from the server (8) to the closed-loop controller (3) or the open-loop controller of the HVACR system (2) via the internet connection and adopting the set of optimized control parameters ($\Theta_k$) by the closed-loop controller (3) or the open-loop controller of the HVACR system (2), or
    sending a notification to a user (B) of the HVACR system (2) with the calculated set of optimized control parameters ($\Theta_k$) and setting, by the user (B), the set of optimized control parameters ($\Theta_k$) on the closed-loop controller (3) or the open-loop controller of the HVACR system (2).

2. The method according to claim 1, wherein the method further comprises:
    detecting, at the time ($t_k$), at least one further value from the group consisting of
        return temperature ($T_{RL}$);
        mass flow ($\dot{m}$);
        solar radiation ($G_{sol}$);
        external heat source input ($P_{FW}$);
    wherein the generated data packet ($D_k$) comprises the further measured value(s) ($T_{RL}$, $\dot{m}$, $G_{sol}$, $P_{FW}$), and the calculation algorithm determines the set of optimized control parameters ($\Theta_k$) on the basis of at least one of the further measured values ($T_{RL}$, $\dot{m}$, $G_{sol}$, $P_{FW}$).

3. The method according to claim 1, wherein the time period ($\Delta t$) used in calculating the set of optimized control parameters ($\Theta_k$) is predefined on the basis of the number of data packets ($D_{0 \ldots k}$) stored in the storage medium (6, 7).

4. The method according to claim 1, wherein the measured values are detected regularly after a predefined time interval has elapsed, and the set of optimized control parameters ($\Theta_k$) is calculated recurrently each time a predetermined plurality of predefined time intervals have elapsed, so that a corresponding plurality of generated data packets ($D_{0 \ldots k}$) for calculating the set of optimized control parameters ($\Theta_k$) are stored in the storage medium (6, 7) of the server (8).

5. A system (1) for determining a set of optimized control parameters ($\Theta_k$) of a closed-loop controller (3) or an open-loop controller for an HVACR (heating, ventilation, air conditioning and refrigeration) system (2) comprising:
    an outside temperature sensor (11) for detecting an outside temperature ($T_A$);
    a room temperature sensor (10) for detecting an actual room temperature ($T_R$), which is arranged in a room (9);
    a supply temperature sensor (12) for detecting a supply temperature ($T_A$);
    an apparatus (17) for presetting a target room temperature ($T_R$, w);
    an apparatus (4) for presetting a target supply temperature ($T_{VL}$, w);
    an apparatus (22) for generating a data packet ($D_k$) with the detected measured values ($T_A$, $T_R$, $T_{R,W}$, $T_{VL}$, $T_{VL,W}$) and a time ($t_k$) of detection;
    a transmission apparatus having an interface (20) for transmitting the data packet ($D_k$) to a server (8) via an internet connection; and
    a storage medium (6, 7) connected to the server (8) for storing the data packet ($D_k$);
    wherein the server (8) has a processor (CPU) configured to:
        calculate a set of optimized control parameters ($\Theta_k$) on the basis of measured values ($T_A$, $T_R$, $T_{R,W}$, $T_{VL}$, $T_{VL,W}$) of the transmitted and stored data packet ($D_k$) of the point in time ($t_k$) and on the basis of:
            measured values ($T_A$, $T_R$, $T_{R,W}$, $T_{VL}$, $T_{VL,W}$) of a plurality of further data packets ($D_{0 \ldots k-1}$) generated at earlier times ($t_{0 \ldots k-1}$) of a specified time period ($\Delta t$); and/or
            at least one of a plurality of previously determined sets of control parameters ($\Theta_{k-1}$);
        execute a calculation algorithm for calculating the set of optimized control parameters ($\Theta_k$) by
            determining a first deviation ($e_R$) between actual room temperature ($T_R$) and target room temperature ($T_{R,W}$) for each data packet ($D_{0 \ldots k}$) of a predefined time period ($\Delta t$),
            determining a second deviation ($e_{VL}$) between supply temperature ($T_R$) and predefined supply temperature ($T_{VL, W}$) for each data packet ($D_{0 \ldots k}$) of the predefined time period ($\Delta t$), and determining and applying a weighting factor (w) between 0 and 1 on the basis of the determined deviations ($e_R$, $e_{VL}$), so that, when calculating the set of optimized control parameters ($\Theta_k$), data packets ($D_{0\ldots k}$) with low deviation are taken more into account and data packets ($D_{0\ldots k}$) with high deviation are taken less into account;

store the calculated set of optimized control parameters ($\Theta_k$) in the storage medium (6, 7) connected to the server (8); and transmit the calculated set of optimized control parameters ($\Theta_k$) via an interface (21) via the internet connection to the closed-loop controller (3) or the open-loop controller of the HVACR system (2) and adopt the set of optimized control parameters ($\Theta_k$) by the closed-loop controller (3) or the open-loop controller of the HVACR system (2), or send a notification with the calculated set of optimized control parameters (Ok) to a user (B) of the HVACR system (2) and, if the user (B) confirms the set of optimized control parameters ($\Theta_k$), adopt the set of optimized control parameters ($\Theta_k$) on the closed-loop controller (3) or the open-loop controller of the HVACR system (2).

6. The system (1) according to claim 5, wherein the system (1) further comprises:

a return temperature sensor (15) for determining a return temperature ($T_{RL}$); and/or a mass flow sensor (13) for detecting a mass flow ($\dot{m}$); and/or a solar radiation sensor (14) for detecting a solar radiation ($G_{sol}$); and/or an apparatus for detecting an external heat source input ($P_{FW}$);

wherein the apparatus (22) for generating a data packet is configured to generate the data packet ($D_k$) with the further measured value(s) ($T_{RL}$, $\dot{m}$, $G_{sol}$, $P_{FW}$), and the processor (CPU) is designed to calculate the set of optimized control parameters ($\Theta_k$) on the basis of at least one of the further measured values ($T_{RL}$, $\dot{m}$, $G_{sol}$, $P_{FW}$).

7. The system (1) according to claim 5, wherein the processor (CPU) of the server (8) is configured to predefine the time period ($\Delta t$) used in calculating the set of optimized control parameters ($\Theta_k$) on the basis of the number of stored data packets ($D_{0\ldots k}$).

8. The system (1) according to claim 5, wherein the sensors detect the measured values regularly after a predefined time interval has elapsed, and the processor (CPU) of the server (8) is configured to recurrently calculate the set of optimized control parameters ($\Theta_k$) each time a predetermined plurality of predefined time intervals have elapsed, so that a corresponding plurality of generated data packets ($D_{0\ldots k}$) is stored in the storage medium (6, 7) of the server (8) for calculating the set of optimized control parameters ($\Theta_k$).

* * * * *